US011768855B1

(12) United States Patent
Hodavdekar et al.

(10) Patent No.: US 11,768,855 B1
(45) Date of Patent: Sep. 26, 2023

(54) REPLICATING DATA ACROSS DATABASES BY UTILIZING VALIDATION FUNCTIONS FOR DATA COMPLETENESS AND SEQUENCING

(71) Applicant: Marqeta, Inc., Oakland, CA (US)

(72) Inventors: Abhishek Hodavdekar, Austin, TX (US); Eric A. Pinkham, Oakland, CA (US); Jeffrey Jow, Bellevue, WA (US); Nathan D. Howell, Palo Alto, CA (US)

(73) Assignee: Marqeta, Inc., Oakland, CA (US)

( * ) Notice: Subject to any disclaimer, the term of this patent is extended or adjusted under 35 U.S.C. 154(b) by 0 days.

(21) Appl. No.: 17/936,684

(22) Filed: Sep. 29, 2022

Related U.S. Application Data

(63) Continuation of application No. 17/821,096, filed on Aug. 19, 2022.

(51) Int. Cl.
*G06F 16/00* (2019.01)
*G06F 16/27* (2019.01)

(52) U.S. Cl.
CPC ................... *G06F 16/273* (2019.01)

(58) Field of Classification Search
CPC ....................................................... G06F 16/273

USPC ......................................................... 707/615
See application file for complete search history.

(56) References Cited

U.S. PATENT DOCUMENTS 10,963,435 B1 * 3/2021 McAlister ........... G06F 11/0766
2017/0193004 A1 * 7/2017 Karuppusamy ..... G06F 11/1004

* cited by examiner

*Primary Examiner* — Chelcie L Daye
(74) *Attorney, Agent, or Firm* — Keller Preece PLLC

(57) ABSTRACT

This disclosure describes methods, non-transitory computer readable storage media, and systems that utilize a plurality of data validation processes to merge or replicate data across databases for downstream operations. For example, in response to a request to merge data from one or more source servers to one or more destination servers, a disclosed system determines database events to merge based on a plurality of database tables accessed in connection with a card account transaction. The disclosed system validates subsets of database events for the accessed database tables based on the quantities and event identifier sequencing of the database events. Additionally, the disclosed system replicates the database events from the source servers to the destination servers in response to validating the completeness and ordering of the database events for the card account transaction.

20 Claims, 9 Drawing Sheets

REPLICATING DATA ACROSS DATABASES BY UTILIZING VALIDATION FUNCTIONS FOR DATA COMPLETENESS AND SEQUENCING

CROSS-REFERENCE TO RELATED APPLICATIONS

The present application is a continuation of U.S. patent application Ser. No. 17/821,096, filed on Aug. 19, 2022. The aforementioned application is hereby incorporated by reference in its entirety.

BACKGROUND

Increases in computing technology and availability have led to an increase in use of card-based payment transactions and electronic payment transactions to complete purchase transactions. In connection with the prevalence of card/electronic payment transactions, many entities (e.g., banks or other issuers) have provided increased access to payment cards (e.g., credit cards) for consumers to use with merchants and recipient entities. Additionally, in connection with providing access to payment cards to use in card-based payment transactions and electronic payment transactions, such entities also generate downstream records and reports based on transaction events for various data analysis tasks. Accordingly, verifying that the data for card-based transactions is accurate and complete is an important aspect of processing the transactions.

While many entities provide increased access to card-based/electronic payment transactions, conventional systems that utilize data associated with the transactions often lack secure and accurate data transmission and storage. Specifically, conventional systems utilize data merging processes that can result in significant data gaps due to merging or replicating data from one database to another database. For instance, conventional systems typically utilize rudimentary data quality checks when merging/replicating data, such as by performing a verification of the number of rows in a database. Accordingly, the conventional systems that utilize such simplistic data quality checks fail to verify the information with a sufficient degree of accuracy for data processes involving payment transactions, resulting in missing or late data necessary to accurately and efficiently perform required downstream recording/reporting tasks.

Additionally, due to the data gaps or other errors caused by conventional systems utilizing rudimentary data quality checks, the conventional systems are also often inefficient. In particular, because the conventional systems use data replication methods that result in data gaps, providing accurate recording/reporting of data requires correcting the data gaps. Thus, because of the data gaps/errors, the conventional systems are often unable to provide accurate real-time recording/reporting. Additionally, the conventional systems typically utilize data error correction processes to fill in the data gaps, which can involve frequently and regularly fixing the data gaps utilizing additional computing resources at a later time.

SUMMARY

This disclosure describes one or more embodiments of methods, non-transitory computer readable media, and systems that solves one or more of the foregoing problems (in addition to providing other benefits). Specifically, in one or more embodiments, the disclosed systems utilize a plurality of data validation processes to merge or replicate data across databases for downstream operations. For example, in response to a request to merge data from one or more source servers to one or more destination servers, the disclosed systems determine database events to merge based on a plurality of database tables accessed in connection with a card account transaction. The disclosed systems validate subsets of database events for the accessed database tables based on the quantities and event identifier sequencing of the database events. Additionally, the disclosed systems replicate the database events from the source servers to the destination servers in response to validating the completeness and ordering of the database events for the card account transaction. By validating the completeness and ordering of the database events, the disclosed systems provide accurate, complete, and efficient data replication across databases.

BRIEF DESCRIPTION OF THE DRAWINGS

The detailed description refers to the drawings briefly described below.

DETAILED DESCRIPTION

Figure 1:
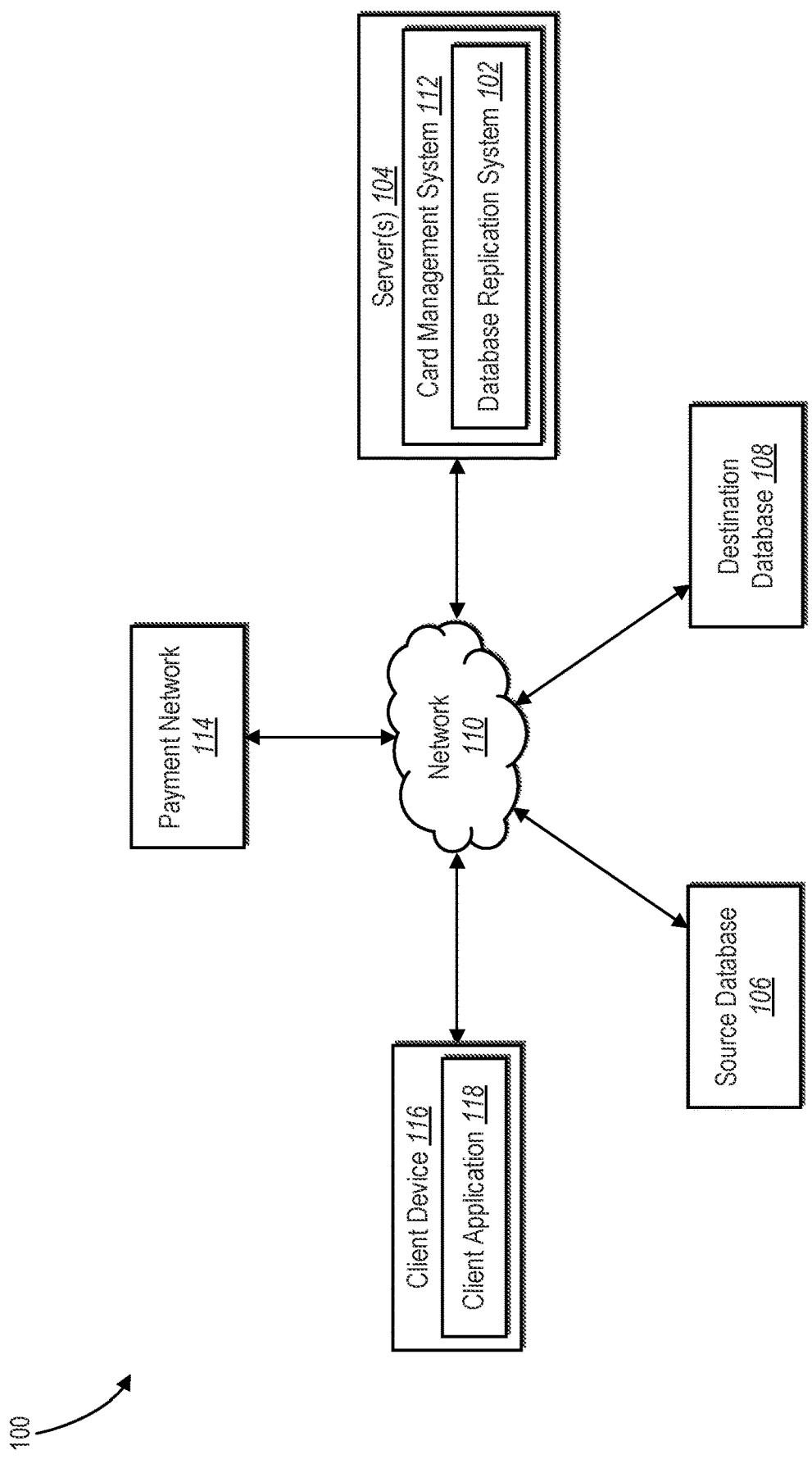
FIG. 1 illustrates a block diagram of a system environment in which a database replication system is implemented in accordance with one or more implementations.

This disclosure describes one or more embodiments of a database replication system that replicates database events corresponding to card account transactions. In particular, the database replication system determines database events in various database tables of source servers in response to a request to merge data to destination servers for downstream operations associated with a card account transaction. The database replication system ingests data from the database tables to determine database events from database tables accessed for the card account transaction and performs consistency checks based on the number and identifiers of database events as the data loads. The database replication system utilizes the consistency checks to validate the database events prior to replicating the database events to the destination servers. Thus, the database replication system ensures the accuracy (e.g., completeness, ordering, and consistency) of data corresponding to a given card account transaction in the destination servers for performing downstream operations utilizing the data.

As mentioned, in one or more embodiments, the database replication system determines a plurality of database events corresponding to a card account transaction. For example, the database replication system receives database events during processing of the card account transaction. To illustrate, the database replication system ingests data from one or more source servers in connection with replicating the data to one or more destination servers. Additionally, in some embodiments, the database replication system utilizes an event queue to process the data from the source servers for replicating to the one or more destination servers and performing one or more additional downstream operations using the data.

In one or more embodiments, the database replication system determines a plurality of database tables accessed in connection with the card account transaction. Specifically, the database replication system determines how many database tables a card account transaction touched via one or more database events at the database tables. In some embodiments, the database replication system also determines a source schema associated with the card account transaction according to the database tables accessed in connection with the card account transaction and/or database events at the database tables.

According to one or more embodiments, the database replication system validates the database events corresponding to a card account transaction via a plurality of consistency checks. In particular, the database replication system validates the completeness of the ingested data based on a number of entries in each of the database tables relative to the number of received database events. Additionally, the database replication system validates the ordering of the ingested data by verifying whether the database events for each database table (or for each source server) is sequential according to unique global transaction identifiers assigned by each server. In one or more embodiments, in response to determining that the number of database events and/or the order of the database events is not consistent, the database replication system waits to receive additional database events to validate the database events.

In one or more additional embodiments, in response to validating database events via consistency checks, the database replication system replicates the database events to one or more destination servers. Specifically, the database replication system replicates the validated database events from source server(s) to the destination server(s) according to a schema of the database events at the source server(s) (e.g., within a plurality of destination tables at the destination server(s)). In some embodiments, the database replication system utilizes the replicated database events at the destination server(s) to perform additional downstream operations, such as generating a report corresponding to the card account transaction based on the validated database events.

The disclosed database replication system provides a number of benefits over conventional systems. For example, the database replication system improves the completeness, continuity, and consistency of computing systems that merge and replicate data in connection with processing card account transactions. In contrast to existing systems that perform data validation based on simple details such as the number of rows in a database, the database replication system verifies the information and order of information prior to merging/replicating data from one database to another. Specifically, the database replication system verifies the completeness of replicated data by determining each database table accessed in connection with a card account transaction and verifying the number of database events within each of the accessed database tables. The database replication system also verifies the ordering of replicated data by verifying the sequence of event identifiers according to assignments of event identifiers by each separate source server.

Additionally, the database replication system improves the efficiency of computing systems that merge and replicate data. Specifically, in contrast to existing systems that utilize rudimentary data checks and allow data gaps and errors during data replication, the database replication system validates database events prior to replication of data from one database to another. Accordingly, while conventional systems can require entities to perform additional data verification or correction operations after replication of data to correct errors, the database replication system verifies the accuracy and completeness of the data prior to replication, thus limiting the computing resources required to accurately replicate data to a single operation. Additionally, by validating the completeness and accuracy of replicated data prior to replication, the database replication system provides the replicated data for additional operations (e.g., downstream reporting) faster than conventional systems.

Furthermore, the database replication system provides improved data accuracy in computing systems that provide data replication. For example, by validating data completeness and consistency from source databases to destination databases prior to replicating data from a source database to a destination database, the database replication system verifies the accuracy of the replicated data. Additionally, by verifying the accuracy of the replicated data prior to data replication, the database replication system provides real-time data replication that is faster than conventional systems by eliminating or reducing the need to correct data after data replication. Accordingly, in contrast to conventional systems that typically require additional validation/correction of data after data replication operations, the database replication system can provide consistent and complete data available for downstream operations upon replicating the data.

The database replication system also prevents data corruption during data replication operations. In contrast to conventional systems that utilize simplistic data validation based only on the number of rows in a given database table, the database replication system verifies that data is present prior to replicating the data. Specifically, the database replication system utilizes the number of database events and event identifiers corresponding to database events to verify that the data being replicated is present and in the correct order prior to replicating the data. Thus, the database replication system can prevent data corruption including missing or incorrectly replicated data resulting from data gaps in data loaded during the replication operations.

Turning now to the figures, FIG. 1 includes an embodiment of a system environment 100 in which a database replication system 102 operates. In particular, the system environment 100 includes server(s) 104, a source database 106, and a destination database 108 in communication via a network 110. FIG. 1 illustrates that the database replication system 102 is part of a card management system 112. Moreover, in one or more embodiments, the system environment 100 includes a payment network 114 and a client device 116 in communication with the server(s) 104 via the network 110. FIG. 1 also illustrates that the client device 116 includes a client application 118.

As shown in FIG. 1, the server(s) 104 include or host the card management system 112. The server(s) 104 communicate with one or more other components in the system environment 100 to manage cards for one or more users. For example, the server(s) 104 communicates with a client device to provide card management for users based on data provided/generated by the payment network 114 in connection with card account transactions. As used herein, the term "card" refers to a physical or digital object corresponding to a card account for engaging in card-based payment transactions. For instance, a card includes a physical credit card or a digital credit card (e.g., in a digital wallet) tied to a payment account via a credit card number that allows a user to initiate a payment transaction to transfer funds from the payment account to a recipient account (e.g., a merchant account) via the payment network 114. In one or more embodiments, the payment network 114 includes one or more payment gateway systems, one or more card networks (e.g., VISA, MASTERCARD), and/or one or more card issuer systems (e.g., bank issuers) to process payment card account transactions in connection with the card management system 112.

Additionally, as used herein, the term "card account transaction" refers to a payment transaction in which a payment card account funds a payment from a user to a recipient. To illustrate, a card account transaction includes a payment transaction involving the use of a physical card or a digital card. For instance, a payment transaction includes a payment transaction via a point-of-sale device or an electronic payment transaction via a mobile application or online application between a payment card account of a user and a recipient account associated with a recipient (e.g., another user or a merchant system) in a peer-to-peer transaction or a peer-to-business transaction.

In one or more embodiments, the card management system 112 also provides downstream operations based on data associated with card account transactions. Specifically, the card management system 112 utilizes data from card account transactions to provide information (e.g., in one or more reports) about the card account transactions to an owner of a card account. Additionally, the card management system 112 can utilize the data from card account transactions to provide reporting information to the payment network 114 or to another entity.

In connection with performing additional operations based on data associated with card account transactions, in one or more embodiments, the card management system 112 utilizes the database replication system 102 to merge/replicate data from the source database 106 to the destination database 108. In particular, in one or more embodiments, the source database 106 includes one or more servers associated with one or more applications or programs involved in processing card account transactions and/or managing databases. For example, the database replication system 102, the card management system 112, and/or another system stores data in the source database 106 based on interactions with the payment network 114 utilizing one or more database programs (e.g., via a relational database management system). The database replication system 102 also merges the data from the source database 106 with the destination database 108 via data replication operations.

In one or more additional embodiments, the card management system 112 utilizes the data in the destination database 108 to perform one or more additional operations. To illustrate, as mentioned, the card management system 112 performs one or more downstream reporting operations based on the data in the destination database 108 after the database replication system 102 replicates the data from the source database 106. For instance, the card management system 112 can perform a downstream reporting operation and provide the results to the payment network 114 and/or to the client device 116. In one or more embodiments, the card management system 112 provides the results for display via the client application 118 of the client device 116. In alternative embodiments, the card management system 112 and/or the database replication system 102 provides information associated with the data replication operations to the client device 116 for display via the client application 118.

In one or more embodiments, in connection with managing cards for payment card accounts, the card management system 112 and/or the database replication system 102 provides one or more additional systems or devices with database management tools and/or card management tools. For example, the one or more additional systems or devices include the client device 116 and/or additional client devices. In one or more embodiments, the card management system 112 provides one or more application programming interfaces ("APIs") for the systems or devices to submit a request to merge/replicate data from the source database 106 to destination database 108. Additionally, the API(s) can provide the client device 116 (or other device associated with a managing entity) with tools to manage downstream reporting operations and/or databases. To illustrate, the client device 116 can communicate with the card management system 112 and/or the database replication system 102 to issue requests to manage database operations and/or perform downstream reporting operations.

In one or more embodiments, the server(s) 104 include a variety of computing devices, including those described below with reference to FIG. 7. For example, the server(s) 104 includes one or more servers for storing and processing data associated with card program management and database management. In some embodiments, the server(s) 104 also include a plurality of computing devices in communication with each other, such as in a distributed storage environment. In some embodiments, the server(s) 104 communicate with a plurality of issuing systems and issuing system devices or other systems and devices of one or more entities based on established relationships between the card management system 112, the database replication system 102, and the entities. To illustrate, the server(s) 104 communicate with various entities or systems including financial institutions (e.g., issuing banks associated with payment cards via the payment network 114), payment card networks associated with processing payment transactions involving payment cards, payment gateways, merchant systems, client devices, or other systems.

In addition, in one or more embodiments, the card management system 112 and/or the database replication system 102 are implemented on one or more servers. For example, the card management system 112 and/or the database replication system 102 can be partially or fully implemented on a plurality of servers. To illustrate, the card management system 112 and the database replication system 102 can be implemented in a distributed environment. In one or more embodiments, each server handles requests for managing card accounts and manages database merging/replication.

In one or more additional embodiments, the source database 106 and the destination database 108 include a variety of computing devices, including those described below with reference to FIG. 7. For instance, the source database 106 and the destination database 108 each include one or more servers for storing data associated with a card account. In some embodiments, the source database 106 includes one or more source servers to communicate with the payment network 114 and/or another system to store data generated in connection with one or more card account transactions. Additionally, the destination database 108 includes one or more destination servers to communicate with the database replication system 102 to replicate data from the source database 106 to the one or more destination servers.

Additionally, as shown in FIG. 1, the system environment 100 includes the network 110. The network 110 enables communication between components of the system environment 100. In one or more embodiments, the network 110 may include the Internet or World Wide Web. Additionally, the network 110 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server(s) 104, the card management system 112, the database replication system 102, the client device 116, the source database 106, and the destination database 108 communicate via the network 110 using one or more communication platforms and technologies suitable for transporting data and/or communication signals, including any known communication technologies, devices, media, and protocols supportive of data communications, examples of which are described with reference to FIG. 7. Additionally, in one or more embodiments, one or more of the various components of the system environment 100 communicate using protocols for financial information communications such as PCI standards or other protocols.

In addition, as shown in FIG. 1, the system environment 100 includes the client device 116. In one or more embodiments, the client device 116 includes, but is not limited to, a mobile device (e.g., smartphone or tablet), a laptop, a desktop, including those explained below with reference to FIG. 7. Furthermore, although not shown in FIG. 1, the client device 116 can be operated by a user (e.g., a user included in, or associated with, the system environment 100) to perform a variety of functions. In particular, the client device 116 performs functions such as, but not limited to, generating, accessing, viewing, and interacting with a database management application. In additional embodiments, the client device 116 performs functions such as, but not limited to, generating, accessing, viewing, and interacting with a card management application. For example, the client device 116 communicates with the server(s) 104 via the network 110 to request or provide information associated with a database management program or a card management program. Although FIG. 1 illustrates the system environment 100 with a single client device, in some embodiments, the system environment 100 includes a different number of client devices.

In one or more embodiments, although FIG. 1 is described in relation to card account transactions, the database replication system 102 can utilize the database merging and data validation operations in connection with other types of transactions. In particular, the database replication system 102 can utilize data consistency checks for merging databases in any type of transaction. For example, the database replication system 102 can validate data associated with records storing personal information about user/entity accounts for a service, medical records related to patients or incidents, or other scenarios involving important data for which data consistency/continuity is important.

Figure 2:
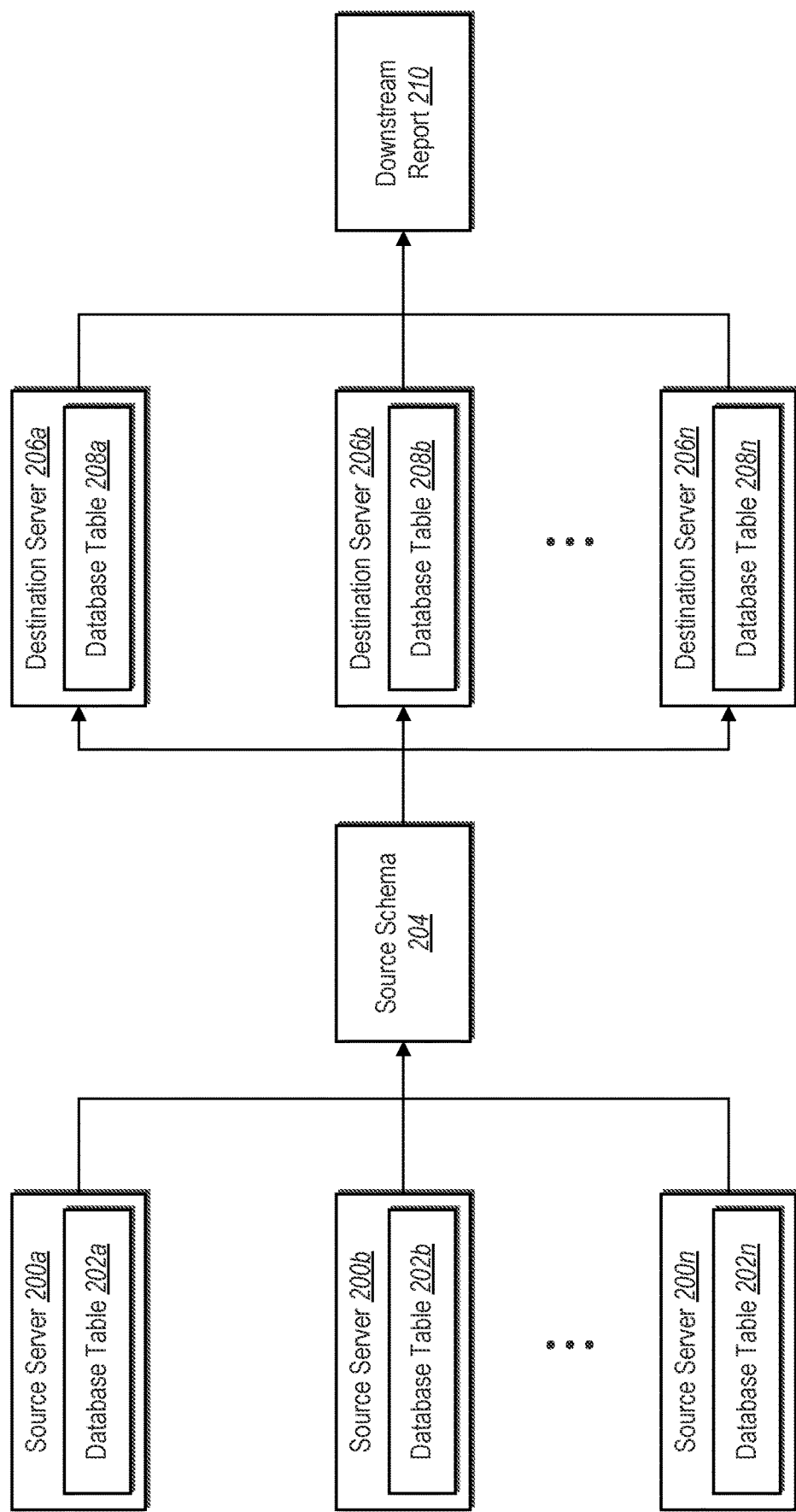
FIG. 2 illustrates a diagram of an overview of the database replication system replicating data from a set of source servers to a set of destination servers in accordance with one or more implementations.

As mentioned, the database replication system 102 provides database management in connection with merging data across databases. For example, FIG. 2 illustrates that the database replication system 102 merges data from source servers to destination servers. Additionally, FIG. 2 illustrates that the database replication system 102 utilizes merged data at the destination servers to perform one or more additional operations (e.g., downstream reporting operations).

In one or more embodiments, as illustrated in FIG. 2, a plurality of source servers 200a-200n include data stored in a plurality of database tables 202a-202n. Specifically, the source servers 200a-200n are part of a source database (e.g., the source database 106 of FIG. 1) that receives and stores information associated with card account transactions. To illustrate, the source database communicates with a third-party system (e.g., a payment network) to store data resulting from processing a card account transaction involving a funding source account (e.g., a funding payment card account) and a recipient account (e.g., in a peer-to-peer transaction or a peer-to-merchant transaction).

Additionally, according to one or more embodiments, the source servers 200a-200n include the database tables 202a-202n corresponding to different aspects of card account transactions. For instance, processing card account transactions can involve a plurality of different operations to store, move, delete, or otherwise modify data stored in one or more of the database tables 202a-202n. To illustrate, the card management system 112 or another system writes data to the database tables 202a-202n or otherwise modifies the database tables 202a-202n in a plurality of database events.

As used herein, the term "database table" refers to a data structure including related data in a table format within a database. For example, the database tables 202a-202n can include entries (e.g., rows) of data related to card account transactions organized in a row-and-column format. Additionally, each database table can include data related to a particular topic (e.g., from a particular application, program, or data type). To illustrate, a first database table 202a includes data corresponding to a first topic (e.g., an "entry" table), a second database table 202b includes data corresponding to a second database program (e.g., a "cache" table), etc. In some embodiments, as illustrated in FIG. 2, each database table is stored on its own source server. In other embodiments, a source server includes more than one database table (e.g., the database tables 202a-202n are stored on a single source server).

Figure 3:
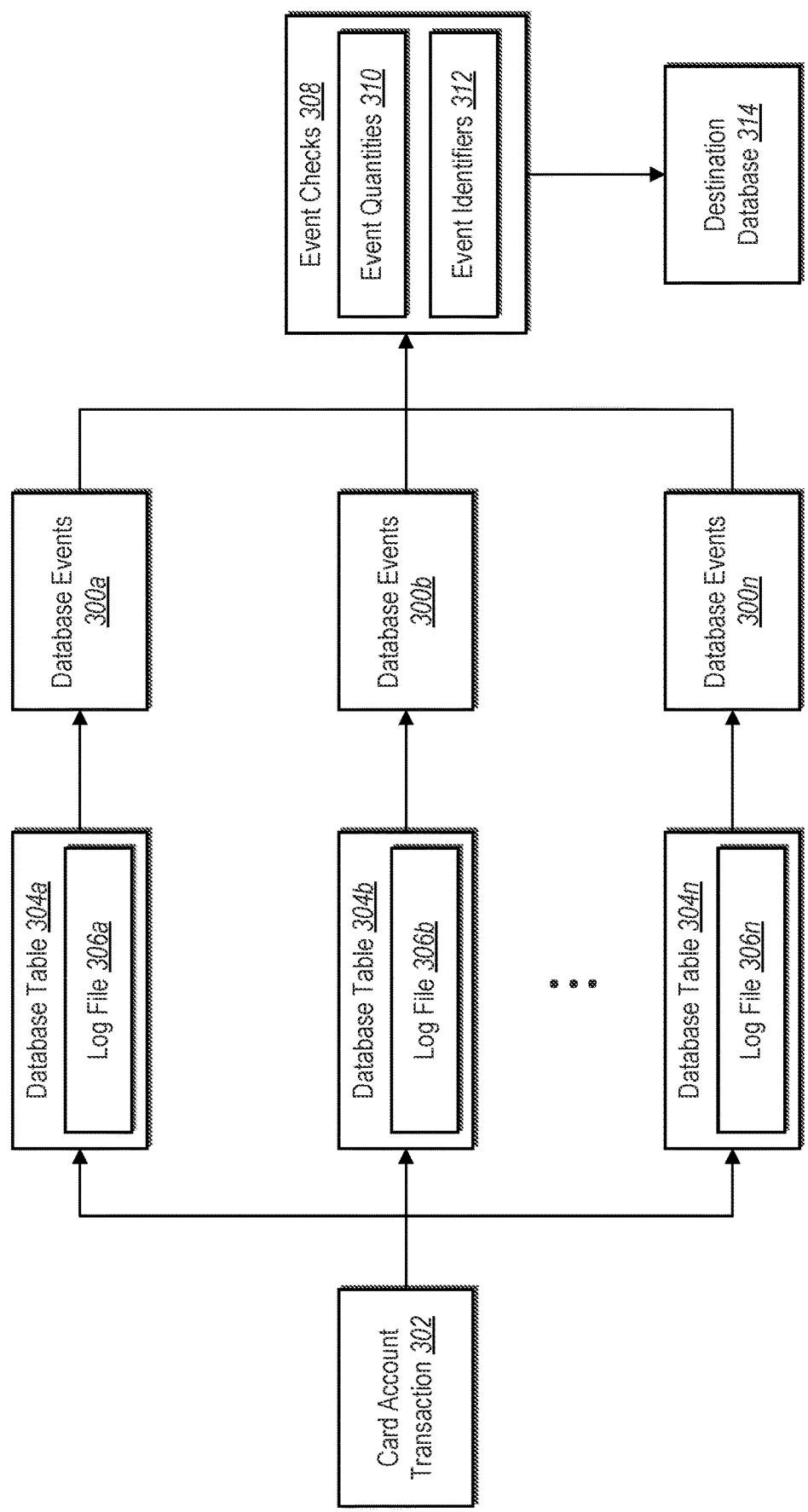
FIG. 3 illustrates a diagram of the database replication system determining database events and performing event checks for a card account transaction during database replication in accordance with one or more implementations.
Figure 4A:
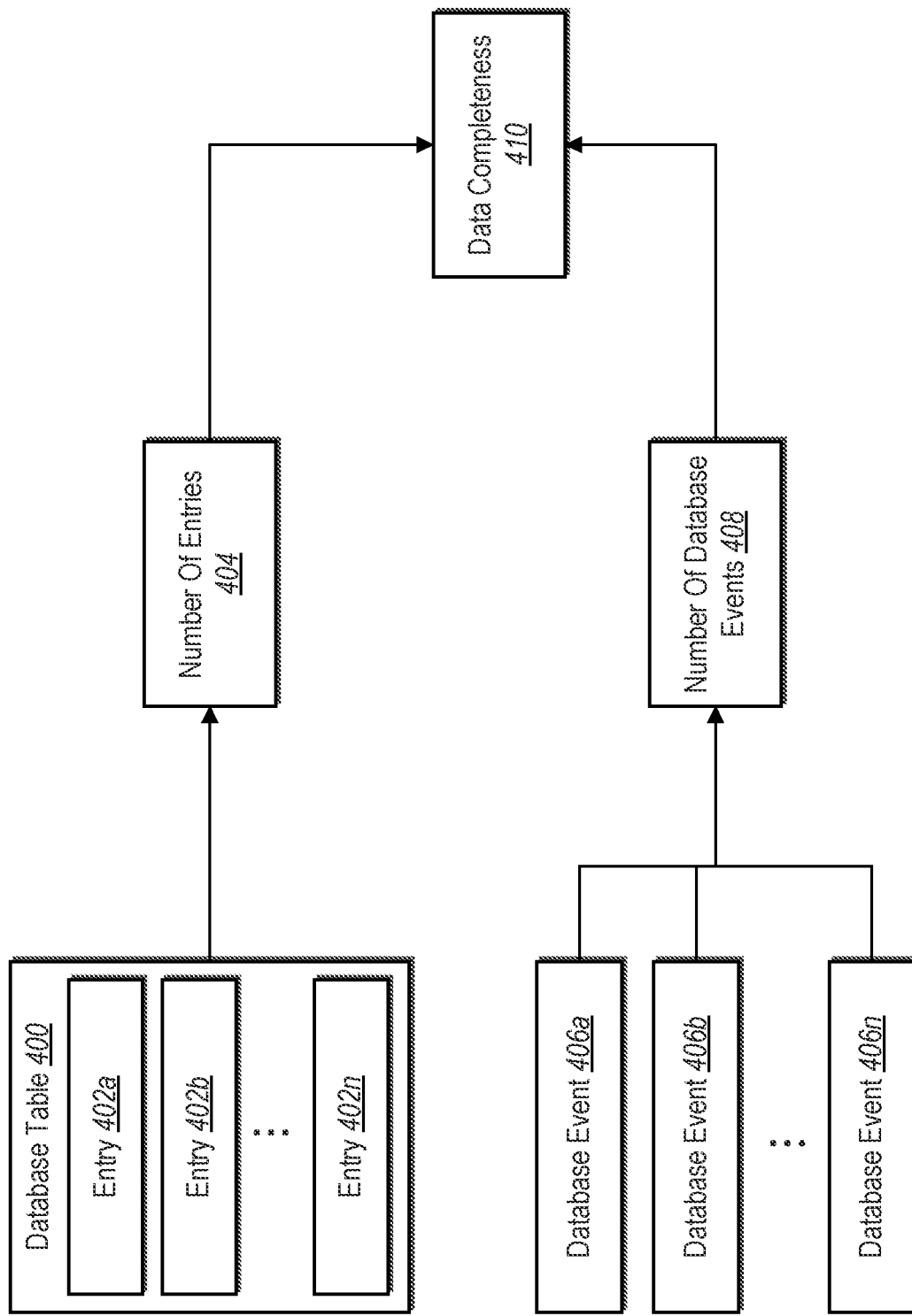
FIGS. 4A-4C illustrate diagrams of the database replication system determining completeness and ordering of database events in connection with a card account transaction in accordance with one or more implementations.
Figure 4B:
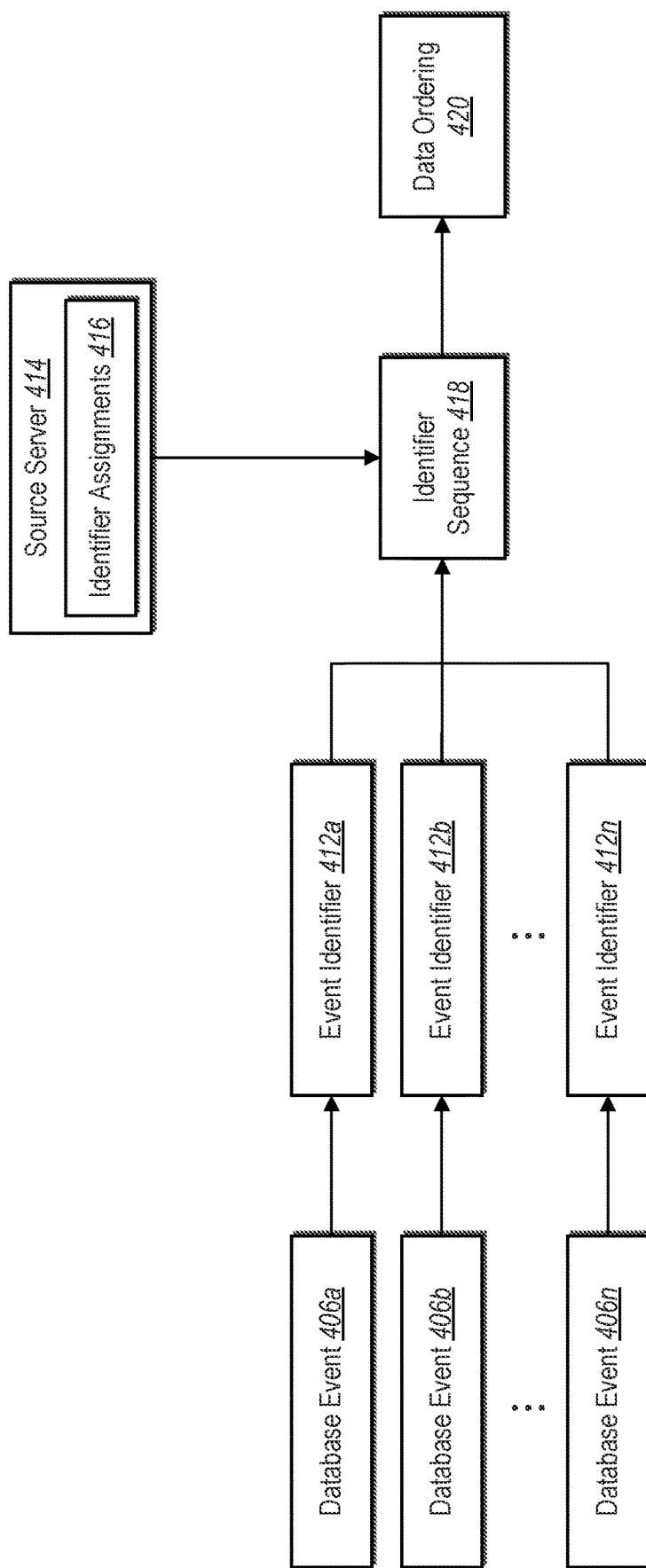
Figure 4C:
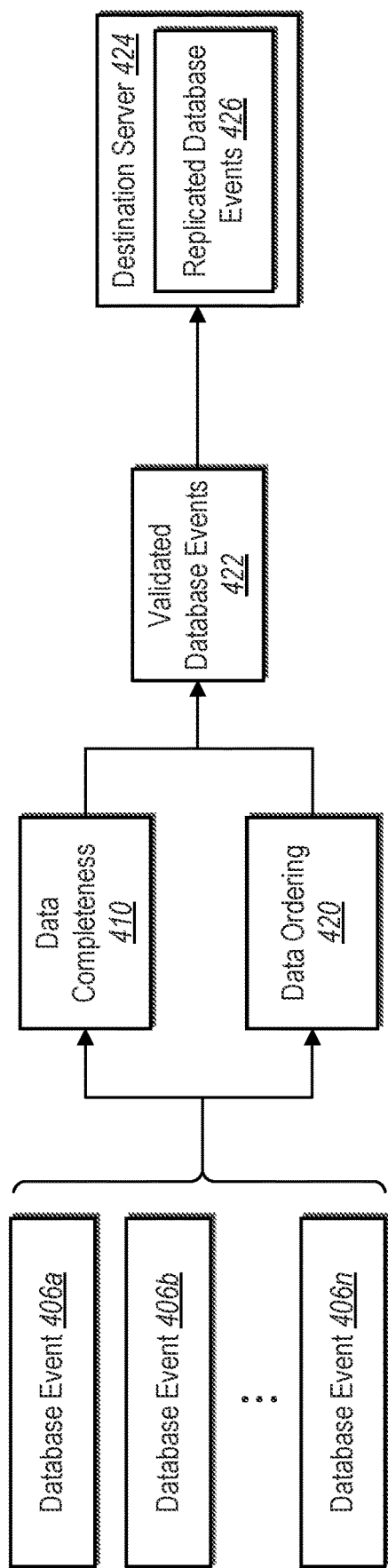

In one or more embodiments, the database replication system 102 replicates the data from the source servers 200a-200n to a separate database. Specifically, the database replication system 102 can determine a source schema 204 of database events corresponding to a card account transaction. For instance, the database replication system 102 determines the source schema 204 based on the database tables 202a-202n and merges the data to a plurality of destination servers 206a-206n. More specifically, the database replication system 102 replicates the data from the database tables 202a-202n on the source servers 200a-200n to database tables 208a-208n at the destination servers 206a-206n according to the source schema 204 while validating the completeness and ordering of the data utilizing a plurality of data validation operations. FIG. 3 and the corresponding description provide additional detail associated with replicating data from a plurality of database tables to a destination database. FIGS. 4A-4C and the corresponding description provide additional detail associated with performing a plurality of data validation operations.

In additional embodiments, the database replication system 102 (or another system such as the card management system 112 of FIG. 1) utilizes the replicated data at the destination servers 206a-206n to generate a downstream report 210. For example, the database replication system 102 utilizes the replicated data to generate a transaction report for the card account transaction based on the database events. In some embodiments, the database replication system 102 utilizes the replicated data to perform one or more additional or alternative operations associated with the card account transaction or a plurality of card account transactions.

As mentioned, FIG. 3 illustrates a diagram of the database replication system 102 replicating data from a source database to a destination database. Specifically, as illustrated in FIG. 3, the database replication system 102 replicates a plurality of database events generated in connection with processing a card account transaction from a plurality of database tables of the source database to a destination database. Furthermore, FIG. 3 illustrates that the database replication system 102 also validates the database events via a plurality of event checks to verify the consistency of the data from the source database to the destination database.

FIG. 3 illustrates that the database replication system 102 determines a plurality of database events 300a-300n associated with a card account transaction 302. In one or more embodiments, the card account transaction 302 includes a request to authorize a payment transaction involving a card account. For instance, a payment network or a system associated with a payment network (e.g., a payment gateway system) provides an authorization request or a funding request to a card management system or a card processing system. To illustrate, the card account transaction includes a request to authorize funding for a payment transaction from a funding source (e.g., a card account) to a recipient (e.g., a merchant account). Additionally, the card account transaction can include additional details, such as, but not limited to, a payment amount, a time of the transaction, a user identifier, a card account number (e.g., a credit card number or debit card number), a recipient account number, or a recipient identifier (e.g., a merchant identifier).

FIG. 3 also illustrates that the database replication system 102 determines a plurality of database tables 304a-304n accessed in connection with the card account transaction 302. In particular, the database replication system 102 determines each database table including one or more entries modified during processing of the card account transaction. For example, to process a card account transaction, a card processing system accesses one or more of the database tables 304a-304n on one or more servers to store data from the card account transaction.

In one or more embodiments, the database tables 304a-304n correspond to a plurality of log files 306a-306n. For instance, the database tables 304a-304n are stored as (or are otherwise associated with) binary log files that include data associated with the card account transaction 302. To illustrate, a binary log file includes data as written to a source database according to a database program. Accordingly, in one or more embodiments, the binary log files 306a-306n include data in a format specific to a particular database program or system (e.g., a relational database management system).

In one or more embodiments, as illustrated in FIG. 3, the database replication system 102 determines the plurality of database events 300a-300n from the database tables. As used herein, the term "database event" refers to a database operation that modifies an entry of a database table. For example, a database event includes an operation to insert data into a database table (e.g., create a new entry), update data in a database table (e.g., modify one or more values in one or more columns of an entry), or delete data from a database table (e.g., remove an entry). In one or more embodiments, a single card account transaction can be associated with (e.g., cause) a plurality of database events in one or more database tables. To illustrate, the card account transaction 302 can be associated with the database events 300a-300n from the plurality of database tables 304a-304n.

Additionally, in one or more embodiments, the database replication system 102 determines the database events 300a-300n from the log files 306a-306n. Specifically, the database replication system 102 reads the log files 306a-306n to determine the database events 300a-300n for the card account transaction 302. In some instances, the log files 306a-306n include data associated with a plurality of card account transactions. Thus, in some embodiments, the database replication system 102 reads the log files 300a-300n to separate the database events 300a-300n from events of other card account transactions.

According to one or more embodiments, in addition to extracting the database events 300a-300n from the log files 306a-306n, the database replication system 102 inserts the database events 300a-300n into an event queue. To illustrate, the database replication system 102 can insert the database events 300a-300n into a queue holding a log of events in a particular sequence. For instance, the database replication system 102 streams the database events 300a-300n from the log files 306a-306n into the event queue for synchronizing into a destination database according to a particular order.

In one or more embodiments, the database replication system 102 performs event checks 308 to validate the database events 300a-300n. For example, as illustrated in FIG. 3, the database replication system 102 determines event quantities 310 with respect to the database tables 304a-304n to validate the completeness of the database events 300a-300n. In additional embodiments, the database replication system 102 determines event identifiers 312 to validate the order of the database events 300a-300n according to one or more servers including the database tables 304a-304n. By validating the completeness and order of the database events 300a-300n, the database replication system 102 can ensure the accuracy, completeness, and consistency of data from the source database to the destination database after replication.

According to one or more embodiments, in response to validating the database events 300a-300n via the event checks 308, the database replication system 102 replicates the database events 300a-300n to the destination database 314. In particular, the database replication system 102 merges the database events 300a-300n extracted from the database table 304a-304n to the destination database 314. For instance, the database replication system 102 merges the database events 300a-300n in an order determined according to the event queue between the source database and the destination database 314.

In one or more embodiments, when synchronizing data from the event queue to the destination database 314, the database replication system 102 writes the data to a history log. Specifically, the history log can include an append-only data structure in which the database replication system 102 appends data from the event queue as the data is entered into the event queue. Accordingly, the database replication system 102 stores the database events 300a-300n in the history log first prior to replicating the data in one or more database tables of the destination database 314. In some embodiments, the database replication system 102 performs the event checks 308 in response to appending the database events 300a-300n into the history log.

Additionally, in response to entering the database events 300a-300n into the history log, the database replication system 102 can load the database events 300*a*-300*n* into the database tables of the destination database 314 according to the source schema corresponding to the database tables 304*a*-304*n* of the source database. For example, in one or more embodiments, the database replication system 102 determines a number of database tables to replicate based on the source schema. The database replication system 102 can also determine event identifiers associated with the database events 300*a*-300*n* according to the source server(s) of the source database to determine how to store the database events 300*a*-300*n* at the destination database 314 according to the source schema.

In one or more additional embodiments, the database replication system 102 determines that data is missing in connection with the card account transaction 302. In particular, the database replication system 102 utilizes the event checks 308 to determine that one or more database events 300*a*-300*n* is missing. For example, in response to determining that the event quantities 310 include mismatching quantities with identified database events in the history log and the database events 300*a*-300*n* in the database tables 304*a*-304*n*, the database replication system 102 can place a hold on replicating the database events 300*a*-300*n* using the source schema. Additionally, in response to determining that the event identifiers 312 include missing identifiers based on identifier assignments of the corresponding source server(s), the database replication system 102 can also place a hole on replicating the database events 300*a*-300*n* using the source schema. Accordingly, if either the event quantities 310 or the event identifiers 312 indicate missing database events, the database replication system 102 can place a hold on replicating the database events 300*a*-300*n*.

For instance, the database replication system 102 can place a hold on replicating the database events 300*a*-300*n* for a period of time. To illustrate, the database replication system 102 can wait for the period of time for additional database events to arrive in the history log. Based on the additional database events, the database replication system 102 can check the quantities and/or event identifiers of the newly received database events to determine whether the event quantities 310 and/or the event identifiers 312 are consistent. In response to determining that the event quantities 310 and the event identifiers 312 are consistent after receiving the additional database events, the database replication system 102 can validate the database events 300*a*-300*n* and replicate the database events 300*a*-300*n* to the destination database 314 according to the source schema.

In one or more embodiments, in response to determining that the event quantities 310 and/or the event identifiers 312 are not consistent after the period of time, the database replication system 102 can determine that an error has occurred. For example, the database replication system 102 can determine that one or more of the source database, the destination database 314, the event queue, or the history log includes an error. In some embodiments, the database replication system 102 can determine that a process that generates, deletes, or otherwise modifies data in the source database, the destination database 314, the event queue, or the history log includes an error. The database replication system 102 can thus generate a flag indicating the missing data for an administrator of the database(s) to analyze and correct the error(s).

FIGS. 4A-4C illustrate additional details associated with performing event checks to validate database events corresponding to a card account transaction. Specifically, FIG. 4A illustrates the database replication system 102 determining a completeness of information corresponding to the card account transaction stored in a source database. More specifically, FIG. 4A illustrates that the database replication system 102 determines whether the event quantities received are consistent with data generated in connection with processing the card account transaction.

In one or more embodiments, as illustrated, the database replication system 102 determines a database table 400 including data associated with a card account transaction. For example, as previously mentioned, the database replication system 102 can access one or more log files of a source database to determine that the database table 400 was accessed in connection with the card account transaction. In particular, a card processing system or a card management system generates data at the source database by accessing the database table 400 in connection with processing or otherwise managing data from the card account transaction.

Accordingly, as illustrated in FIG. 4A, the database replication system 102 includes a plurality of entries 402*a*-402*n* including data corresponding to the card account transaction. In one or more embodiments, each entry 402*a* includes a record based on an action to insert, modify/update, or delete information according to the card account transaction. For instance, the database replication system 102 determines which entries in the database table 402*a*-402*n* include data affected by processing the card account transaction. To illustrate, the entries 402*a*-402*n* can include modified data based on account identifiers or a payment amount associated with the card account transaction.

In one or more embodiments, the database replication system 102 determines a number of entries 404 including data associated with the card account transaction. Specifically, the database replication system 102 determines the number of entries 404 in the database table 400 generated or otherwise modified in connection with the card account transaction. To illustrate, the database replication system 102 determines the number of entries 404 based on the number of rows of the database table 400 that include data modified in connection with the card account transaction. In addition, the database replication system 102 can determine a number of entries in each database table touched based on the card account transaction.

According to one or more embodiments, the database replication system 102 also determines a plurality of database events 406*a*-406*n* identified based on the database table 400. In particular, as mentioned, the database replication system 102 determines the database events 406*a*-406*n* by identifying data received in connection with the card account system for replicating to a destination database. In one or more embodiments, the database replication system 102 determines a number of database events 408 received in connection with replicating the data corresponding to the card account system.

In particular, as mentioned, the database replication system 102 determines the plurality of database events 406*a*-406*n* in connection with the card account transaction. For instance, the database replication system 102 determines a plurality of received database events in response to a request to merge/replicate data from a source database to a destination database. In addition, the request to merge/replicate the data can be part of, or otherwise associated with, one or more downstream operations.

In at least some embodiments, the database replication system 102 determines data completeness 410 of data received in connection with the card account transaction. Specifically, the database replication system 102 compares the number of entries 404 corresponding to the entries 402*a*-402*n* in the database table 400 to the number of database events 408. In some embodiments, in response to determining that the number of entries 404 matches the number of database events 408, the database replication system 102 determines that the data is complete. In additional embodiments, in response to determining that the number of entries 404 does not match the number of database events 408, the database replication system 102 determines that the data is not complete.

FIG. 4B illustrates that the database replication system 102 checks the ordering of data corresponding to a card account transaction. In particular, as mentioned, the database replication system 102 determines the plurality of database events 406a-406n for performing an additional data check in connection with the card account transaction and/or in connection with one or more downstream operations. For example, the database replication system 102 determines the database events 406a-406n to check the ordering of the data associated with the card account transaction.

Additionally, as illustrated, the database replication system 102 determines a plurality of event identifiers 412a-412n corresponding to the database events 406a-406n. For instance, the database replication system 102 determines the event identifiers 412a-412n based on data extracted from columns of the corresponding entries in a database table. To illustrate, each database event can have an assigned event identifier stored in a particular column of a corresponding entry of a database table. Thus, the database replication system 102 determines the event identifiers 412a-412n for all of the received database events 406a-406n in connection with merging/replicating operations to store data from a source database at a destination database.

FIG. 4B also illustrates that the database replication system 102 determines a source server 414 from the source database. Specifically, the database replication system 102 determines the source server 414 based on the storage location of the database table 400 corresponding to the database events 406a-406n (e.g., the server on which the database table 400 is stored). As previously described, a source database can include a plurality of source servers for a plurality of database tables. Accordingly, each source server stores one or more database tables including different sets of database events.

According to one or more embodiments, the database replication system 102 also communicates with the source server 414 to determine identifier assignments 416 corresponding to the source server 414. To illustrate, each server can utilize a server-specific list of identifier assignments for assigning event identifiers to database events based on a history of loaded identifiers corresponding to the source server 414. More specifically, each source server has a unique set of identifiers that the source server assigns to database events based on the order in which the database events occur. For example, the database replication system 102 determines the identifier assignments based on incremental global transaction identifiers assigned by the source server 414.

In one or more embodiments, the database replication system 102 determines an identifier sequence 418 for the event identifiers 412a-412n. In particular, the database replication system 102 determines the order that the event identifiers 412a-412n should follow based on the identifier assignments 416 of the source server 414. For instance, the database replication system 102 determines a particular location in the identifier sequence 418 that the event identifiers 412a-412n should begin. The database replication system 102 also determines where the event identifiers 412a-412n should end in the identifier sequence 418 based on the number of database events.

In some embodiments, the database replication system 102 performs a data consistency check to determine a data ordering 420 of the database events 406a-406n. Specifically, the database replication system 102 determines whether the event identifiers 412a-412n follow the identifier sequence 418 according to the identifier assignments 416. For instance, because the event identifiers 412a-412n designate a relative position in which each database event occurred at the source server 414, the database replication system 102 determines a position that the event identifiers 412a-412n should have based on the identifier assignments 416 at the source server 414. In response to determining that the event identifiers 412a-412n are consistent with the identifier sequence 418, the database replication system 102 determines that the data ordering 420 of the database events 406a-406n is correct. Alternatively, in response to determining that the event identifiers 412a-412n are not consistent with the identifier sequence 418, the database replication system 102 determines that the data ordering 420 of the database events 406a-406n is not correct.

FIG. 4C illustrates that the database replication system 102 determines whether to validate data and replicate the data based on the data consistency checks of FIGS. 4A-4B. In particular, the database replication system 102 determines whether to replicate the database events 406a-406n based on received/loaded data and the data stored at the source database in connection with the card account transaction. For example, the database replication system 102 determines whether to replicate the data in response to determining the data consistency and data ordering.

In one or more embodiments, the database replication system 102 determines whether to replicate the database events 406a-406n by determining whether the database events 406a-406n pass the data completeness 410 and the data ordering 420 checks. For instance, in response to determining that the database events 406a-406n are complete and ordered properly based on the quantities of database events and corresponding event identifiers, the database replication system 102 validates the database events, resulting in the validated database events 422 as shown in FIG. 4C. Specifically, the database replication system 102 utilizes the validated database events 422 to replicate the database events 406a-406n at the destination server 424. More specifically, the database replication system 102 stores replicated database events 426 at the destination server 424 according to a source schema at the source server.

In one or more embodiments, in response to determining that the database events 406a-406n do not pass the data consistency checks, the database replication system 102 does not replicate the database events 406a-406n to the destination server 424. In particular, if the number of database events is not consistent between the source data and the received data, the database replication system 102 can place a hold on replicating the data. Additionally, if the ordering of database events is not correct (e.g., one or more missing event identifiers), the database replication system 102 can place a hold on replicating the data. The database replication system 102 can thus place a hold on replicating the data in response to either of the data consistency checks failing for the database events 406a-406n.

Figure 5:
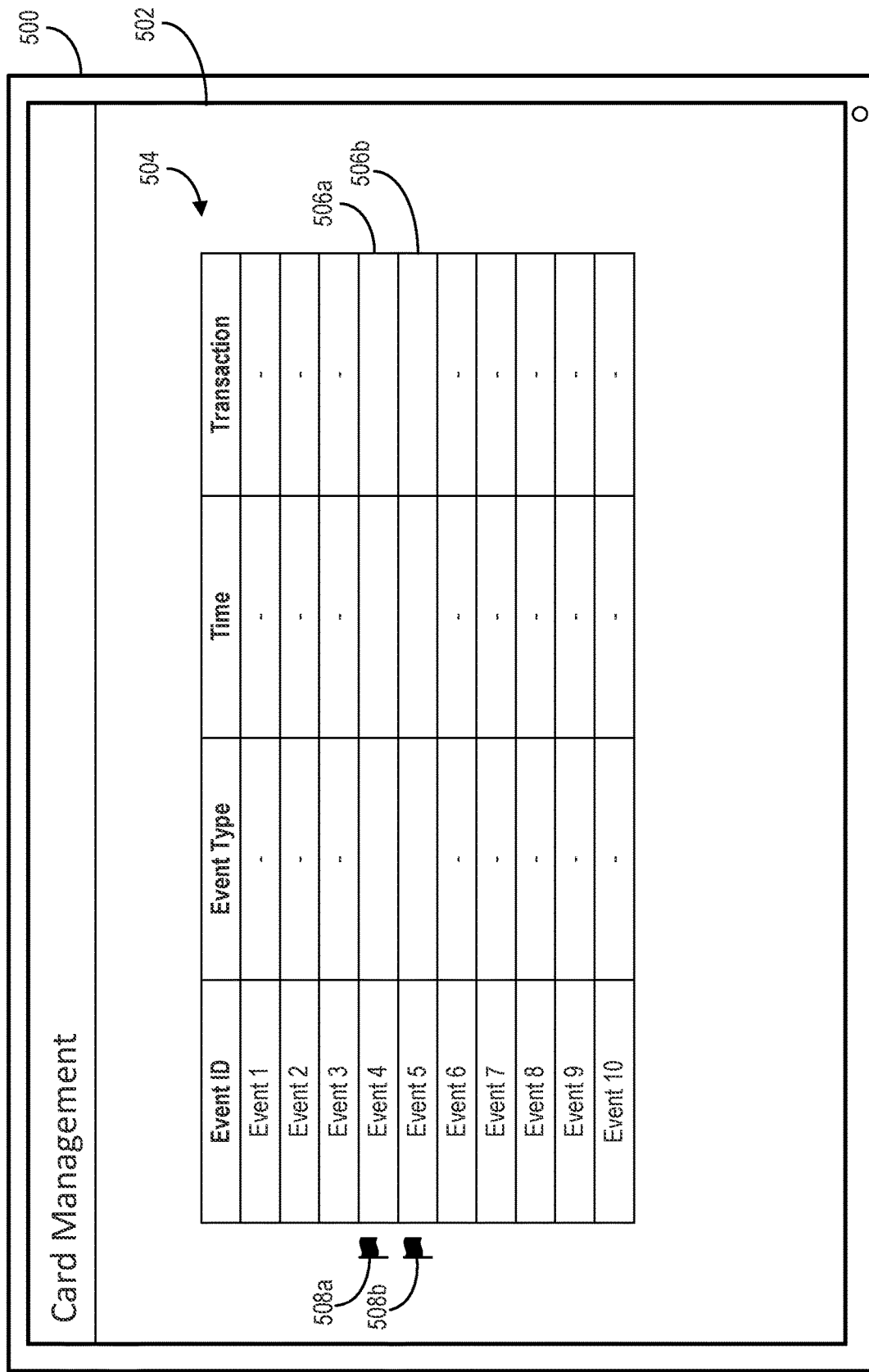
FIG. 5 illustrates a graphical user interface for displaying flagged errors in a database replication process in accordance with one or more implementations.

As previously mentioned, in one or more embodiments, the database replication system 102 flags errors for correction in response to a particular set of database events failing data consistency checks for a period of time. FIG. 5 illustrates that the database replication system 102 provides an indication of one or more errors in response to failed consistency checks for display at a client device 500. Additionally, in some embodiments, the database replication system 102 provides the indication for correcting errors in a database replication operation based on the flagged information.

As illustrated in FIG. 5, a client device 500 (e.g., a desktop device, a laptop device, or a mobile device) displays a graphical user interface of a client application 502 associated with database management. The client device 500 can display tools associated with managing a database (e.g., for verifying data, managing database operations). To illustrate, the client device 500 can provide tools for an administrator user to use in connection with replicating data from one or more source databases to one or more destination databases. In some embodiments, the client device 500 also provides tools for performing additional operations associated with card program management.

FIG. 5 illustrates that the client device 500 displays a database table 504 including a plurality of database events corresponding to a card account transaction. For example, the client device 500 displays the database table 504 including a plurality of received database events in connection with a merging/replication operation to replicate data corresponding to the card account transaction from a source database to a destination database. In one or more embodiments, the database replication system 102 performs one or more data consistency checks on data associated with the card account transaction to determine whether to replicate the data to the destination database.

According to one or more embodiments, in response the database replication system 102 determining that the database events in the database table 504 do not pass the consistency checks, the database replication system 102 can determine that one or more of the database events is delayed or missing. For instance, the database replication system 102 determines that a first database event 506a and a second database event 506b missing from the database table 504. To illustrate, the database replication system 102 identifies the missing database events based on corresponding event identifiers, such as in response to determining that the event identifiers of the received database events are not contiguous according to the corresponding source server.

In one or more embodiments, in response to the database replication system 102 determining that the database events fail the data consistency checks and/or after a specific period of time of delay during the replication operation, the database replication system 102 flags one or more errors identified based on the failed data consistency checks. Specifically, in response to determining that the first database event 506a and the second database event 506b are missing, the database replication system 102 flags the first database event 506a and the second database event 506b. Additionally, the client device 500 displays a first flag indicator 508a and a second flag indicator 508b next to the corresponding positions of the missing database events in the database table 504. Accordingly, the client device 500 displays indicators that the database events are not complete and contiguous.

According to one or more embodiments, the client device 500 also provides tools for analyzing and correcting errors based on flagged data. For instance, the client device 500 can communicate with the database replication system 102 to find the database events at the source database, modify an event queue, modify a history log, or modify one or more applications associated with generating, modifying, or removing data at one or more servers. The database replication system 102 can update the data and/or applications in response to the communications from the client device 500 to correct the errors causing the missing database events.

According to one or more embodiments, the database replication system 102 utilizes a plurality of database management operations to access data from one or more servers in connection with a database merging operation. Specifically, the database replication system 102 can perform an operation to pull a list of shards from a server in connection with determining a history of event identifiers for the server. For example, the operation can analyze the shards to look up corresponding server addresses and queries a table of executed global transaction identifiers in each of the shards. The database replication system 102 uses the extracted information to populate an event identifier history table for determining the first event identifier executed by the server.

Additionally, in one or more embodiments, the database replication system 102 runs a script to determine a schema for replicating data to a destination database. In particular, the database replication system 102 runs the script to compare the source schema in a schema registry against a schema for a replica table on the destination database. The database replication system 102 can also execute one or more operations to make the source schema and the schema for the replica table match.

By verifying the source schemas prior to populating the replica table, the database replication system 102 verifies that loaded records match the schema at the destination database. For example, the database replication system 102 can access the largest global transaction identifier for a server in the history table prior to checking the source schema in the schema registry. The database replication system 102 can thus ensure that all records having a global transaction identifier less than the largest global transaction identifier conform to the correct schema.

In one or more embodiments, the database replication system 102 initiates an operation to replicate data from the source database to the destination database. For instance, the database replication system 102 utilizes a structured query function that merges records between pairs of event identifiers in the specified range of global transaction identifiers. According to one or more embodiments, the database replication system 102 determines beginning load pointers that represent the values passed in by a beginning load function or a value of one greater than the last loaded global transaction identifier for each server. For a case in which identifiers from the server have never been loaded, the database replication system 102 determines whether a first loaded global transaction identifier has been recorded. Furthermore, if neither of the previous cases applies, the database replication system 102 loads from the first global transaction identifier in the table of executed identifiers.

In one or more additional embodiments, the database replication system 102 determines whether a first loaded global transaction identifier exists indicating that the first global transaction identifier was replicated to a history table. In such a case, the database replication system 102 determines whether a server existed before the database replication system 102 started the replication operation. Accordingly, the database replication system 102 prevents the replication operation from attempting to load a value that is not present.

According to one or more embodiments, the database replication system 102 performs an operation to determine a range of global transaction identifiers to load for each server in a database replication operation. The database replication system 102 determines the beginning load pointers, schema valid pointers determined in connection with checking the schema, the last loaded global transaction identifier for each server assignment, and the first global transaction identifier for each server from the history of event identifiers for the server. The database replication system 102 also determines the largest interval of identifiers starting from either the last loaded global transaction identifier or a manually specified beginning load pointer that is both contiguous (e.g., no missing event identifiers) and that every database event for the card account transaction for that server/database table is present.

In one or more embodiments, the database replication system 102 performs a query function to determine transaction boundaries as follows:

Database event quantities: The database replication system 102 determines the number of database events that touch a target database table at a source server with global event identifiers lying between the beginning load pointer and the schema valid pointer. The database replication system 102 determines that database events that do not touch the target database table are included with a zero record count.

Event counts: The database replication system 102 collects database events from an event history table.

Groups: The database replication system 102 utilizes a query that performs four functions.

1) The database replication system 102 simplifies later selections by left joining the database event quantities to event counts such that counts from database events and event sources are side-by-side.

2) The database replication system 102 left joins the database event quantities to server unique identifier metadata to calculate an identifier offset for each server. The offset represents the number from which the database replication system 102 starts counting to validate the sequencing of identifiers corresponding to records in the database table. To illustrate, an offset of five results in the database replication system 102 validating that event identifiers five, six, and seven, etc., are present. The database replication system 102 uses the identifier offset to be the event identifier of the beginning load pointer if the beginning load pointer is specified and has the same value as the record being analyzed. Otherwise, the database replication system 102 determines the identifier offset as the first global transaction identifier for that server from the server unique identifier metadata table.

3) The database replication system 102 determines a relative database event order.

4) The database replication system 102 determines a value indicating a cumulative number of missing database events. Specifically, the database replication system 102 determines a running total of missing database events across all database events by the server.

In one or more embodiments, the database replication system 102 compares an event identifier of a database event to the offset and relative database event order to determine whether the database events are consecutive. According to one or more embodiments, consecutive database events starting from the first database event (beginning load pointer if specified, otherwise, the first event identifier for the server) has a value of global transaction identifier—identifier offset—relative database event order=0. The largest and smallest global transaction identifiers for each server form the boundaries of the valid event identifiers.

In some embodiments, the database replication system 102 also provides diagnostics for display on a client device in connection with database management. For instance, the database replication system 102 determines, for each server unique identifier loaded, the query function above also returns a plurality of diagnostic data points. To illustrate, the database replication system 102 returns a range of loadable records (contiguous and complete), the next range of non-contiguous records (e.g., a range of records that appear after at least one database event missing from the database tables, the range of incomplete records (e.g., the range of records where the first such record is incomplete), the range of missing records (e.g., the first set of missing records after the contiguous values), and the executed range of global transaction identifiers for the server unique identifier.

To illustrate, the database replication system 102 generates a message for display including the following information:

a6dc04b0-884g-4ec3-96c9-abdd36a89e54
Loadable: [5, 100],
Complete: [5, 100],
Incomplete: [101, 200],
Contiguous: [5, 125],
Noncontiguous: [151, 200],
Beginning load pointer: a6dc04b0-884g-4ec3-96c9-abdd36a89e54:5,
Schema valid pointer: a6dc04b0-884g-4ec3-96c9-abdd36a89e54:200,
Executed global transaction identifier: [1, 250], Based on the generated message above, the database replication system 102 determines that events 5 to 100 are loadable (contiguous and complete). Additionally, the database replication system 102 determines that events 5 to 100 are complete (e.g., all events in this range are present in the history table). The database replication system 102 also determines that event 101 is incomplete (e.g., missing records in the history table but the event is present in a transaction table). This indicates that events 101 to 200 are not loadable due to event 101 being incomplete. The database replication system 102 determines that events 126 to 150 are missing (e.g., not present in the transaction tables). The database replication system 102 also determines that events 151 and 200 are present, but transactions before 151 are missing.

Additionally, the database replication system 102 determines, based on the above information, to load events beginning at 5 due to the beginning load pointer. Additionally, because the executed global transaction identifier has values before the beginning load pointer, the database replication system 102 can determine that the server has previously loaded records, a first loaded global transaction identifier was specified at some point, or the beginning load pointer was specified to start at 5.

The database replication system 102 can also determine that the schema was last checked from the source database at the time when event 200 was the largest global transaction identifier in the history table. Additionally, the database replication system 102 can determine that the last update from the server indicated that the server had executed events 1 to 250.

In one or more embodiments, the database replication system 102 performs a record merging function to merge records with global transaction identifiers in the range determined by the previously indicated query. Given that more than one database event can touch the same record in a database table (e.g., as determined by a primary key), the database replication system 102 verifies that only the most recent record is merged. For example, for each server unique identifier, the database replication system 102 determines the record with the largest event identifier as the most recent record for the primary key regardless of timestamp inaccuracies.

Additionally, the database replication system 102 uses the above information to determine the record with the most recent timestamp. For instance, the database replication system 102 can use timestamp information to determine whether more than one update has been made to a record corresponding to a single primary key from different servers. The database replication system 102 can determine that such timestamp inaccuracies are due to a topology change, given that such timestamp inaccuracies are smaller than the amount of time needed for a topology change.

In one or more embodiments, the database replication system 102 utilizes the script as a comma-separate list of global transaction identifiers. The database replication system 102 can use the script to add a first loaded global transaction identifier event type to a metastore. If a record exists for the server unique identifier which has been passed in, the script can throw an exception.

In one or more embodiments, the database replication system 102 also utilizes an intermediate layer between one or more source servers and one or more destination servers to replicate data. For instance, the database replication system 102 maps database events obtained from the source server(s) to a single event (e.g., a domain event) at the intermediate layer. To illustrate, the database replication system 102 stores information associated with the source schema of a card account transaction with the mapping at the intermediate layer.

The database replication system 102 replicates the database events to the one or more destination servers in connection with the mapping via the intermediate layer. In one or more embodiments, the database replication system 102 utilizes the intermediate layer to provide data protection (e.g., at the destination server(s)) in the event of rogue changes to data at the source server(s) (e.g., tables, and vice-versa. The database replication system 102 can thus protect the destination server(s) from changes to columns or other values in the database tables at the source server(s).

Figure 6:
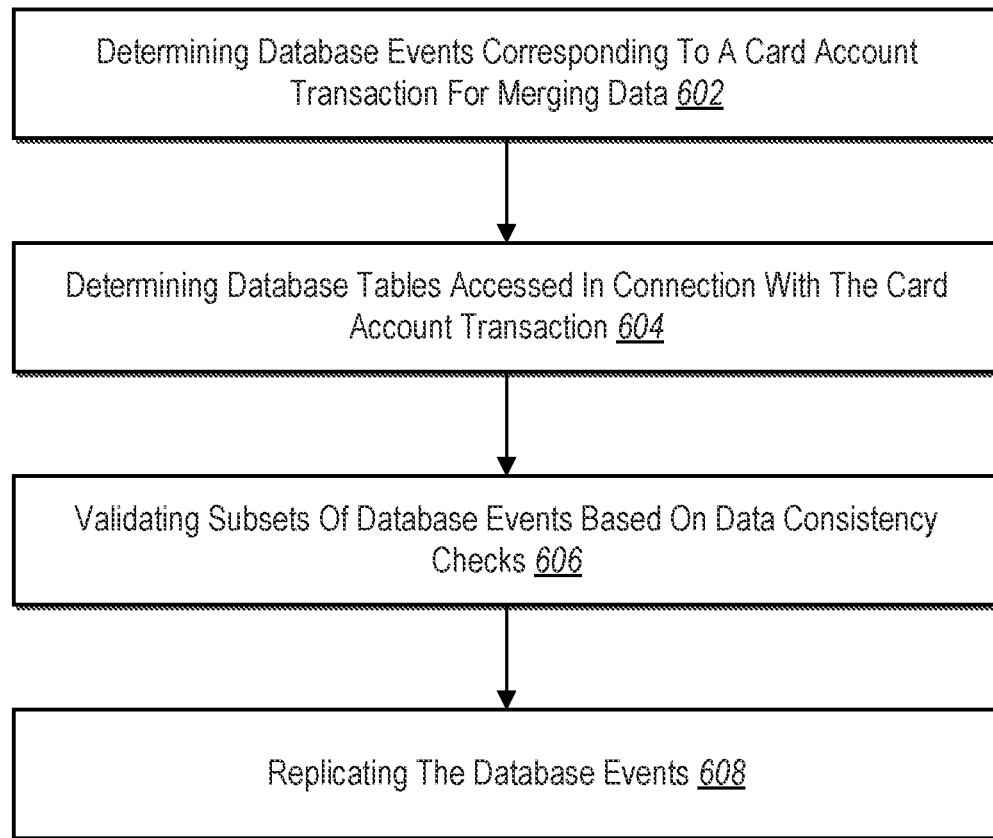
FIG. 6 illustrates a flowchart of a series of acts for validating data completeness and ordering in a database replication process in accordance with one or more implementations.

Turning now to FIG. 6, this figure shows a flowchart of a series of acts 600 of validating data completeness and ordering in a database replication process. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer readable storage medium can comprise instructions, that when executed by one or more processors, cause a computing device to perform the acts of FIG. 6. In still further embodiments, a system can perform the acts of FIG. 6.

As shown in FIG. 6, the series of acts 600 includes an act 602 of determining database events corresponding to a card account transaction for merging data. For example, act 602 involves determining, in response to a request to merge data from one or more source servers to one or more destination servers, a plurality of database events corresponding to a card account transaction.

Act 602 can involve determining one or more database insert events, one or more database update events, or one or more database delete events to modify the plurality of database tables in connection with the card account transaction.

Act 602 can involve accessing the plurality of database events from a plurality of log files at a plurality of source database tables according to a source schema at the one or more source servers. Act 602 can involve appending the plurality of database events from the plurality of source database tables into an event queue comprising an event history corresponding to the card account transaction.

The series of acts 600 also includes an act 604 of determining database tables accessed in connection with the card account transaction. For example, act 604 involves determining, for the plurality of database events, a plurality of database tables accessed at the one or more source servers in connection with the card account transaction.

Additionally the series of acts 600 includes an act 606 of validating subsets of database events based on data consistency checks. For example, act 606 involves validating, for the plurality of database tables, subsets of database events of the plurality of database events based on quantities of the subsets of database events and sequences of event identifiers of the subsets of database events.

Act 606 can involve determining an identifier sequence corresponding to a source server comprising the database table of the plurality of database tables. Act 606 can also involve determining that the plurality of event identifiers of the subset of database events correspond to the identifier sequence corresponding to the source server. Act 606 can involve validating the subsets of database events in response to determining that a plurality of event identifiers of the subset of database events are sequential based on a unique identifier assignment of the database table of the plurality of database tables.

Act 606 can involve determining, from a database table of the plurality of database tables, a number of entries corresponding to the card account transaction. Act 606 can also involve validating a subset of database events by comparing the number of entries to a number of database events in a subset of database events of the plurality of database events received in connection with the request to merge the data. Act 606 can also involve validating the subset of database events in response to the number of entries matching the number of database events in the subset of database events.

Act 606 can involve determining, for a database table of the plurality of database tables, a plurality of event identifiers of a subset of database events corresponding to the card account transaction. Act 606 can also involve validating the subset of database events in response to determining that the plurality of event identifiers are sequential. For example, act 606 can involve determining, for an additional database table of the plurality of database tables, a plurality of additional event identifiers of an additional subset of database events corresponding to the card account transaction, the plurality of additional event identifiers being assigned according to the additional database table separate from the plurality of event identifiers of the subset of database events. Act 606 can also involve validating the additional subset of database events in response to determining that the plurality of additional event identifiers are sequential. Act 606 can also involve validating the subset of database events associated with the database table based on the number of entries corresponding to the card account transaction and the plurality of event identifiers of the subset of database events.

Act 606 can involve determining, based on the quantities of the subsets of database events or the sequences of event identifiers of the subsets of database events, that one or more database events corresponding to the card account transaction are missing. Act 606 can also involve maintaining a hold on the request to merge the data until the one or more database events is received from the one or more source servers.

Act 606 can involve determining, based on the quantities of the subsets of database events or the sequences of event identifiers of the subsets of database events, that one or more database events corresponding to the card account transaction are missing for a threshold time period. Act 606 can also involve generating, for display on a display device in response to the one or more database events being missing for the threshold time period, a flag for the one or more database events indicating to correct one or more errors causing the one or more database events to be missing.

Act 606 can involve determining an identifier sequence corresponding to a source server comprising the database table of the plurality of database tables. Act 606 can also involve determining that the plurality of event identifiers of the subset of database events correspond to the identifier sequence corresponding to the source server.

Act 606 can involve determining, for a first database table of the plurality of database tables, a first set of event identifiers of a first subset of database events corresponding to the card account transaction. Act 606 can involve determining, for a second database table of the plurality of database tables, a second set of event identifiers of a second subset of database events corresponding to the card account transaction.

Act 606 can further involve validating the first subset of database events in response to determining that the first set of event identifiers are sequential according to a first unique identifier assignment of the first database table. For example, act 606 can involve validating a first subset of database events according to a first number of database events and a first sequence of event identifiers corresponding to a first database table of the plurality of database tables. Act 606 can also involve validating the second subset of database events in response to determining that the first set of event identifiers are sequential according to a first unique identifier assignment of the first database table. For example, act 606 can involve validating a second subset of database events according to a second number of database events and a second sequence of event identifiers corresponding to a second database table of the plurality of database tables.

The series of acts 600 further includes an act 608 of replicating the database events. For example, act 608 involves replicating, in response to validating the subsets of database events, the plurality of database events from the one or more source servers to the one or more destination servers. Act 608 can involve replicating the plurality of database events to the one or more destination servers according to the source schema.

Act 608 can involve replicating the subset of database events to the one or more destination servers in response to validating the subset of database events. Act 608 can also involve replicating the additional subset of database events to the one or more destination servers in response to validating the additional subset of database events.

Act 608 can involve replicating the first subset of database events and the second subset of database events to the one or more destination servers in response to validating the first subset of database events and the second subset of database events. Act 608 can also involve determining a source schema of the plurality of database events corresponding to the card account transaction at the one or more source servers. Act 608 can further involve replicating the first subset of database events and the second subset of database events at the one or more destination servers according to the source schema.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
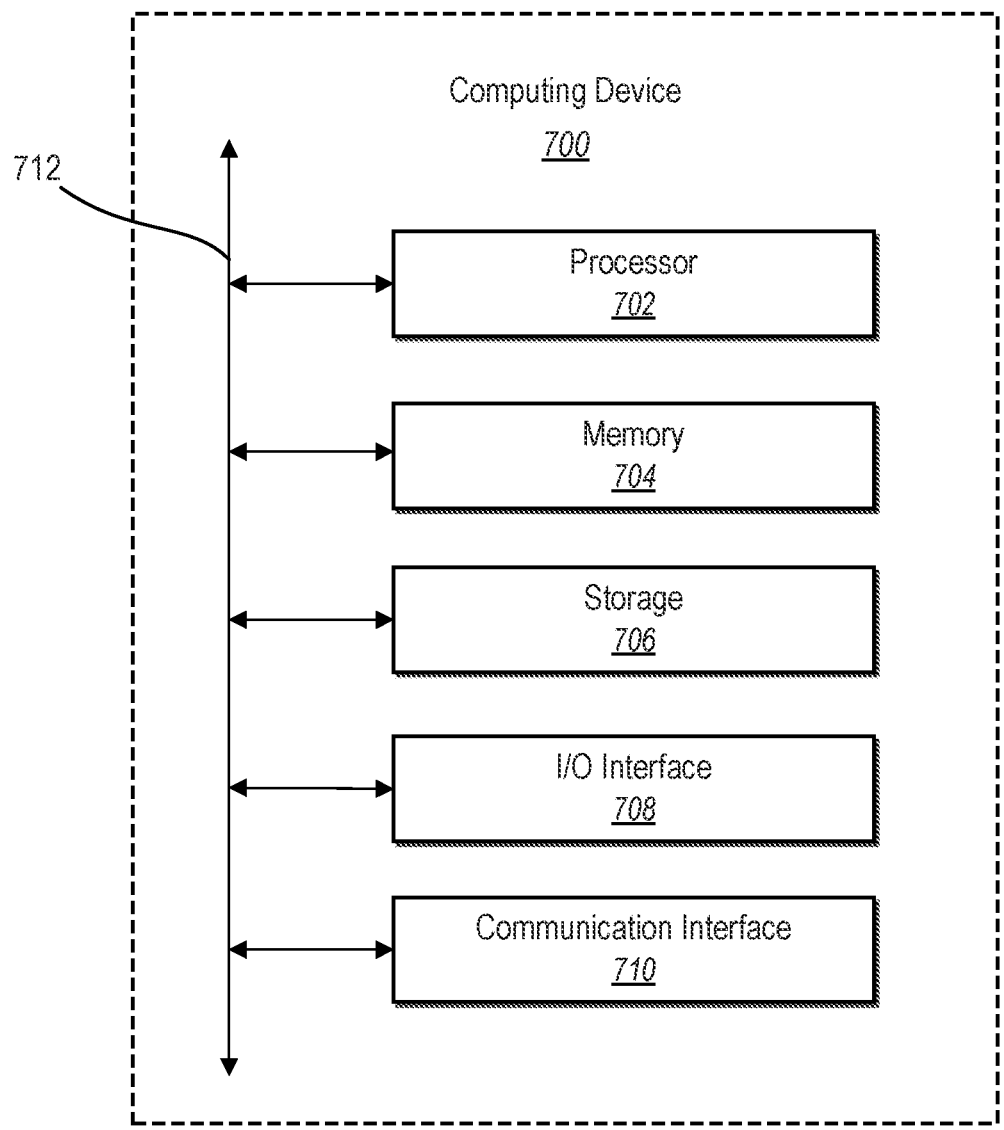
FIG. 7 illustrates a block diagram of an exemplary computing device in accordance with one or more implementations.

FIG. 7 illustrates a block diagram of exemplary computing device 700 that may be configured to perform one or more of the processes described above. One will appreciate that one or more computing devices such as the computing device 700 may implement the system(s) of FIG. 1. As shown by FIG. 7, the computing device 700 can comprise a processor 702, a memory 704, a storage device 706, an I/O interface 708, and a communication interface 710, which may be communicatively coupled by way of a communication infrastructure 712. In certain embodiments, the computing device 700 can include fewer or more components than those shown in FIG. 7. Components of the computing device 700 shown in FIG. 7 will now be described in additional detail.

In one or more embodiments, the processor 702 includes hardware for executing instructions, such as those making up a computer program. As an example, and not by way of limitation, to execute instructions for dynamically modifying workflows, the processor 702 may retrieve (or fetch) the instructions from an internal register, an internal cache, the memory 704, or the storage device 706 and decode and execute them. The memory 704 may be a volatile or non-volatile memory used for storing data, metadata, and programs for execution by the processor(s). The storage device 706 includes storage, such as a hard disk, flash disk drive, or other digital storage device, for storing data or instructions for performing the methods described herein.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example, and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 710 may facilitate communications with various types of wired or wireless networks. The communication interface 710 may also facilitate communications using various communication protocols. The communication infrastructure 712 may also include hardware, software, or both that couples components of the computing device 700 to each other. For example, the communication interface 710 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
   determining, by at least one processor in response to a request to merge data from one or more source servers to one or more destination servers, a plurality of database events corresponding to a card account transaction, wherein each database event of the plurality of database events comprises a database operation at the one or more source servers to write data to one or more database tables, delete data from the one or more database tables, or modify data at the one or more database tables, w herein determining the plurality of database events comprises:
      accessing the plurality of database events from a plurality of log files at a plurality of source database tables according to a source schema at the one or more source servers; and
      appending the plurality of database events from the plurality of source database tables into an event queue comprising an event history corresponding to the card account transaction;
   determining, by the at least one processor for the plurality of database events, a plurality of database tables accessed at the one or more source servers to write, delete, or modify data in the plurality of database tables via a plurality of database operations in connection with the card account transaction according to event identifiers generated for the plurality of database events by the one or more source servers;
   validating, by the at least one processor for the plurality of database tables, subsets of database events of the plurality of database events based on quantities of the subsets of database events and sequences of event identifiers generated for the subsets of database events by the one or more source servers; and
   replicating, by the at least one processor in response to validating the subsets of database events, the plurality of database events from the one or more source servers to the one or more destination servers according to the source schema.

2. The computer-implemented method of claim 1, wherein validating the subsets of database events comprises:
   determining, from a database table of the plurality of database tables, a number of entries corresponding to the card account transaction; and
   validating a subset of database events by comparing the number of entries to a number of database events in a subset of database events of the plurality of database events received in connection with the request to merge the data.

3. The computer-implemented method of claim 1, wherein validating the subsets of database events comprises:
   determining, for a database table of the plurality of database tables, a plurality of event identifiers generated by the one or more source servers for a subset of database events corresponding to the card account transaction; and
   validating the subset of database events in response to determining that the plurality of event identifiers are sequential.

4. The computer-implemented method of claim 3, wherein validating the subsets of database events comprises:
   determining, for an additional database table of the plurality of database tables, a plurality of additional event identifiers generated by the one or more source servers for an additional subset of database events corresponding to the card account transaction, the plurality of additional event identifiers being assigned according to the additional database table separate from the plurality of event identifiers of the subset of database events; and
   validating the additional subset of database events in response to determining that the plurality of additional event identifiers are sequential.

5. The computer-implemented method of claim 4, wherein replicating the plurality of database events comprises:
   replicating the subset of database events from the one or more source servers to the one or more destination servers in response to validating the subset of database events; and
   replicating the additional subset of database events from the one or more source servers to the one or more destination servers in response to validating the additional subset of database events.

6. The computer-implemented method of claim 1, wherein validating the subsets of database events comprises:
   determining, based on the quantities of the subsets of database events or the sequences of event identifiers of the subsets of database events, that one or more database events corresponding to the card account transaction are missing; and
   maintaining a hold on the request to merge the data until the one or more database events is received from the one or more source servers.

7. The computer-implemented method of claim 1, wherein validating the subsets of database events comprises:
   determining, based on the quantities of the subsets of database events or the sequences of event identifiers of the subsets of database events, that one or more database events corresponding to the card account transaction are missing for a threshold time period; and
   generating, for display on a display device in response to the one or more database events being missing for the threshold time period, a flag for the one or more database events indicating to correct one or more errors causing the one or more database events to be missing.

8. The computer-implemented method of claim 1, wherein determining the plurality of database events comprises determining one or more database insert events, one or more database update events, or one or more database delete events to modify the plurality of database tables in connection with the card account transaction.

9. The computer-implemented method of claim 1, wherein replicating the plurality of database events from the one or more source servers to the one or more destination servers comprises:
   determine the source schema at the one or more source servers;
   compare the source schema in a schema registry to a schema for a replica table at the one or more destination servers; and
   execute one or more operations to match the schema for the replica table match the source schema.

10. A system comprising:
   at least one processor; and
   a non-transitory computer readable medium comprising instructions that, when executed by the at least one processor, cause the system to:
      determine, in response to a request to merge data from one or more source servers to one or more destination servers, a plurality of database events corresponding to a card account transaction, wherein each database event of the plurality of database events comprises a database operation at the one or more source servers to write data to one or more database tables, delete data from the one or more database tables, or modify data at the one or more database tables, wherein determining the plurality of database events comprises:
         accessing the plurality of database events from a plurality of log files at a plurality of source database tables according to a source schema at the one or more source servers; and
         appending the plurality of database events from the plurality of source database tables into an event queue comprising an event history corresponding to the card account transaction;
      determine, for the plurality of database events, a plurality of database tables accessed at the one or more source servers to write, delete, or modify data in the plurality of database tables via a plurality of database operations in connection with the card account transaction according to event identifiers generated for the plurality of database events by the one or more source servers;
      validate, for the plurality of database tables, subsets of database events of the plurality of database events based on quantities of the subsets of database events and sequences of event identifiers generated for the subsets of database events by the one or more source servers; and
      replicate, in response to validating the subsets of database events, the plurality of database events from the one or more source servers to the one or more destination servers according to the source schema.

11. The system of claim 10, further comprising instructions that, when executed by the at least one processor, cause the system to validating the subsets of database events by:
   determining, from a database table of the plurality of database tables, a number of entries corresponding to the card account transaction;
   determining, for the database table of the plurality of database tables, a plurality of event identifiers generated by the one or more source servers for a subset of database events corresponding to the card account transaction; and
   validating the subset of database events associated with the database table based on the number of entries corresponding to the card account transaction and the plurality of event identifiers of the subset of database events.

12. The system of claim 11, further comprising instructions that, when executed by the at least one processor, cause the system to validate the subset of database events by:
   determining an identifier sequence corresponding to a source server comprising the database table of the plurality of database tables; and
   determining that the plurality of event identifiers of the subset of database events correspond to the identifier sequence corresponding to the source server.

13. The system of claim 10, further comprising instructions that, when executed by the at least one processor, cause the system to validate the subsets of database events by:
   determining, for a first database table of the plurality of database tables, a first set of event identifiers generated by the one or more source servers for a first subset of database events corresponding to the card account transaction;
   determining, for a second database table of the plurality of database tables, a second set of event identifiers generated by the one or more source servers for a second subset of database events corresponding to the card account transaction;
   validating the first subset of database events in response to determining that the first set of event identifiers are sequential according to a first unique identifier assignment of the first database table; and
   validating the second subset of database events in response to determining that the second set of event identifiers are sequential according to a second unique identifier assignment of the second database table.

14. The system of claim 13, further comprising instructions that, when executed by the at least one processor, cause the system to replicate the subsets of database events by replicating the first subset of database events and the second subset of database events from the one or more source servers to the one or more destination servers in response to validating the first subset of database events and the second subset of database events.

15. The system of claim 14, further comprising instructions that, when executed by the at least one processor, cause the system to replicate the subsets of database events by:
   compare a schema for a replica table at the one or more destination servers to the source schema; and
   modify the schema of the replica table according to the source schema.

16. A non-transitory computer readable medium comprising instructions that, when executed by at least one processor, cause a computing device to:
   determine, in response to a request to merge data from one or more source servers to one or more destination servers, a plurality of database events corresponding to a card account transaction, wherein each database event of the plurality of database events comprises a database operation at the one or more source servers to write data to one or more database tables, delete data from the one or more database tables, or modify data at the one or more database tables, wherein determining the plurality of database events comprises:
      accessing the plurality of database events from a plurality of log files at a plurality of source database tables according to a source schema at the one or more source servers; and
      appending the plurality of database events from the plurality of source database tables into an event queue comprising an event history corresponding to the card account transaction;

determine, for the plurality of database events, a plurality of database tables accessed at the one or more source servers to write, delete, or modify data in the plurality of database tables via a plurality of database operations in connection with the card account transaction according to event identifiers generated for the plurality of database events by the one or more source servers;

validate, for the plurality of database tables, subsets of database events of the plurality of database events based on quantities of the subsets of database events and sequences of event identifiers generated for the subsets of database events by the one or more source servers; and replicate, in response to validating the subsets of database events, the plurality of database events from the one or more source servers to the one or more destination servers according to the source schema.

17. The non-transitory computer readable medium of claim 16, further comprising instructions that, when executed by the at least one processor, cause the computing device to validate the subsets of database events by:

comparing, for a database table of the plurality of database tables, a number of entries corresponding to the card account transaction to a number of database events in a subset of database events of the plurality of database events received in connection with the request to merge the data; and validating the subset of database events in response to the number of entries matching the number of database events in the subset of database events.

18. The non-transitory computer readable medium of claim 17, further comprising instructions that, when executed by the at least one processor, cause the computing device to validate the subsets of database events in response to determining that a plurality of event identifiers generated by the one or more source servers for the subset of database events are sequential based on a unique identifier assignment of the database table of the plurality of database tables.

19. The non-transitory computer readable medium of claim 16, further comprising instructions that, when executed by the at least one processor, cause the computing device to validate the subsets of database events by:

validating a first subset of database events according to a first number of database events and a first sequence of event identifiers corresponding to a first database table of the plurality of database tables; and validating a second subset of database events according to a second number of database events and a second sequence of event identifiers corresponding to a second database table of the plurality of database tables.

20. The non-transitory computer readable medium of claim 19, further comprising instructions that, when executed by the at least one processor, cause the computing device to replicate the plurality of database events by replicating, in response to validating the first subset of database events and the second subset of database events, the first subset of database events and the second subset of database events to the one or more destination servers according to the source schema.

* * * * *